United States Patent
Isono (10) Patent No.: US 7,907,356 B2
(45) Date of Patent: Mar. 15, 2011

(54) IMAGE PICKUP LENS AND IMAGE PICKUP APPARATUS (75) Inventor: Masashi Isono, Hino (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 12/296,610

(22) PCT Filed: Apr. 2, 2007

(86) PCT No.: PCT/JP2007/057387
§ 371 (c)(1),
(2), (4) Date: Oct. 9, 2008

(87) PCT Pub. No.: WO2007/119647
PCT Pub. Date: Oct. 25, 2007

(65) Prior Publication Data
US 2009/0201593 A1   Aug. 13, 2009

(30) Foreign Application Priority Data
Apr. 14, 2006   (JP) .................. 2006-111900

(51) Int. Cl.
*G02B 9/12*   (2006.01)

(52) U.S. Cl. .......................... 359/785; 359/784
(58) Field of Classification Search .......... 359/771–775, 359/779, 780, 781–783, 791, 792
See application file for complete search history.

(56) References Cited

U.S. PATENT DOCUMENTS

| | | | | |
|---|---|---|---|---|
| 3,877,795 A * | 4/1975 | Yamashita | ..... | 359/749 |
| 5,642,229 A * | 6/1997 | Kaneko et al. | ..... | 359/649 |
| 6,937,401 B2 * | 8/2005 | Sugano | ..... | 359/649 |
| 7,345,830 B2 * | 3/2008 | Shinohara | ..... | 359/772 |
| 2006/0227434 A1 * | 10/2006 | Hirose et al. | ..... | 359/749 |

FOREIGN PATENT DOCUMENTS

| | | |
|---|---|---|
| JP | 2004-309695 | 11/2004 |
| JP | 2005-55600 | 3/2005 |

* cited by examiner

*Primary Examiner* — Timothy J Thompson
(74) *Attorney, Agent, or Firm* — Finnegan, Henderson, Farabow, Garrett & Dunner, L.L.P.

(57) ABSTRACT

An image pickup lens includes, in order from an object side thereof: a first lens; a second lens comprising a surface facing the image surface side of the image pickup lens which is an aspheric surface; and a third lens. The aspheric surface has a concave shape facing the image surface side at a paraxial portion and has a convex shape facing the image surface side at the periphery.

17 Claims, 5 Drawing Sheets

IMAGE PICKUP LENS AND IMAGE PICKUP APPARATUS

CROSS REFERENCE TO RELATED APPLICATIONS

This application is a U.S. National Phase Application under 35 USC 371 of International Application No. PCT/JP2007/119647, filed on Apr. 2, 2007, and claims the priority of Japanese Patent Application No. 2006-111900, filed Apr. 14, 2006, the content of both of which is incorporated herein by reference.

TECHNICAL FIELD

The present invention relates to a small-sized image pickup lens system, and in particular, to an image pickup lens and an image pickup apparatus which provide a high-performance and are compact in size and which are used for a solid-state image pickup element and are suitable for digital input equipment (such as a digital still camera and a digital video camera).

BACKGROUND

In recent years, along with the popularization of personal computers and others, a digital still camera and a digital video camera (which, are simply called "a digital camera" from flow on) which can easily take image information into digital equipment are spreading over a level of an individual user. The digital cameras of this kind are expected to spread more and more as an input equipment, also in the future.

Further, downsizing of a solid-state image pickup element such as CCD (Charge Coupled Device) mounted in a digital camera is advanced. Along with the advancement of downsizing, the digital cameras are required to be further downsized. For this reason, an image pickup lens system that occupies the greatest volume in the digital input equipment is strongly requested to be compact. The easiest way to make an image pickup lens to be downsized is a method to make a size of a solid-state image pickup element to be small. For that purpose, however, it is necessary to make a size of a light-receiving element to be small, which requires a higher level of difficulty of manufacturing a solid-state image pickup element and requires higher capability of the image pickup lens.

On the other hand, when a size of an image pickup lens is made small while keeping a size of a solid-state image pickup element as it is, a position of an exit pupil gets closer inevitably. When the position of an exit pupil gets closer, an off-axis light flux emitted from an image pickup lens enters an image surface obliquely. Therefore, light-converging capability of a micro-lens is hardly exhibited sufficiently, and it causes a problem that brightness of an image is extremely uneven between a central portion and a peripheral portion of an image. When trying to keep a position of an exit pupil of an image pickup lens at a distance for solving the aforesaid problem, size growing of a total image taking lens is not avoidable. In addition, a demand of low-cost of an image pickup lens has become strong, because of competition to keep the prices down in recent years. Further, density growth of a solid-state image pickup element in recent years has raised capability requested for the image pickup lens.

For the aforesaid demands, there has been formulated a compact lens in a three-lens structure for a solid-state image pickup element (for example, see Patent Document 1: Unexamined Japanese Patent Application Publication No. 2004-309695).

DISCLOSURE OF THE INVENTION

Problems to be Solved by the Invention

However, the aforesaid conventional lens is not suitable for the solid-state image pickup element because a position of an exit pupil is near although it is compact.

The present invention has been achieved in view of the aforesaid circumstances, and an object of the present invention is to provide an image pickup lens that has excellent optical capabilities, is low in cost, and is compact in size to be used for a solid-state image pickup element.

Means to Solve the Problems

To solve the problems, an embodiment of the present invention is an image pickup lens comprising, in order from an object side thereof: a first lens; a second lens comprising a surface facing an image surface side which is an aspheric surface having a concave shape facing the image surface side at a paraxial portion and having a convex shape facing the image surface side at a periphery; and a third lens.

In the above embodiment, it is preferable that the first lens is a meniscus lens whose surface facing the object side is a convex surface.

In the above embodiment, it is preferable that the third lens comprises a surface facing the image surface side which is an aspheric surface having a concave shape facing the image surface side at a paraxial portion and having a convex shape facing the image surface side at a periphery.

In the above embodiment, it is preferable that the image pickup lens further comprises an aperture stop arranged at a closer position to the object side than the first lens.

In the above embodiment, it is preferable that the second lens satisfies a following expression.

$$0.3 < (r21 + r22)/(r21 - r22) < 90 \tag{1}$$

In the expression, r21 is a curvature radius of a surface of the second lens facing the object side, and r22 is a curvature radius of the surface of the second lens facing the image surface side.

Another embodiment of the present invention is an image pickup apparatus comprising: the above image pickup lens; and a solid-state image pickup element for conducting an image-pickup using a light flux entering therein through the image pickup lens.

EFFECT OF THE INVENTION

According to the present invention, an image pickup lens for a solid-state image pickup element can have excellent optical capabilities and can be low in cost and be compact in size. Applying this image pickup lens to the image pickup apparatus such as a digital camera can contribute to enhancing function, decreasing of the cost, and downsizing of the image pickup apparatus.

EXPLANATION OF NOTATION

O1 Optical axis
100 Digital still camera
101 Optical system
1 Image pickup lens
10 First lens
20 Second lens
30 Third lens
D1 Aperture stop
GF Glass filter
102 Solid-state image pickup element
103 A/D conversion section
104 Controller
105 Optical system driving section
106 Timing generating section
107 Image pickup element driving section
108 Image memory
109 Image processing section
110 Image compression section
111 Image recording section
112 Display section
113 Operation section
200 Cell-phone
210 Controller
220 Operation section
230 Display section
240 Radio communication section
241 Antenna
250 Image pickup unit
260 Storing section
270 Temporary storing section

BEST MODE FOR CARRYING OUT THE INVENTION

An embodiment of the invention will be explained in detail as follows, referring to attached drawings. However, the claims of the invention are not limited to the examples explained below. Incidentally, "power" mentioned in the present description means an amount defined by an inverse number of a focal length.

Figure 1:
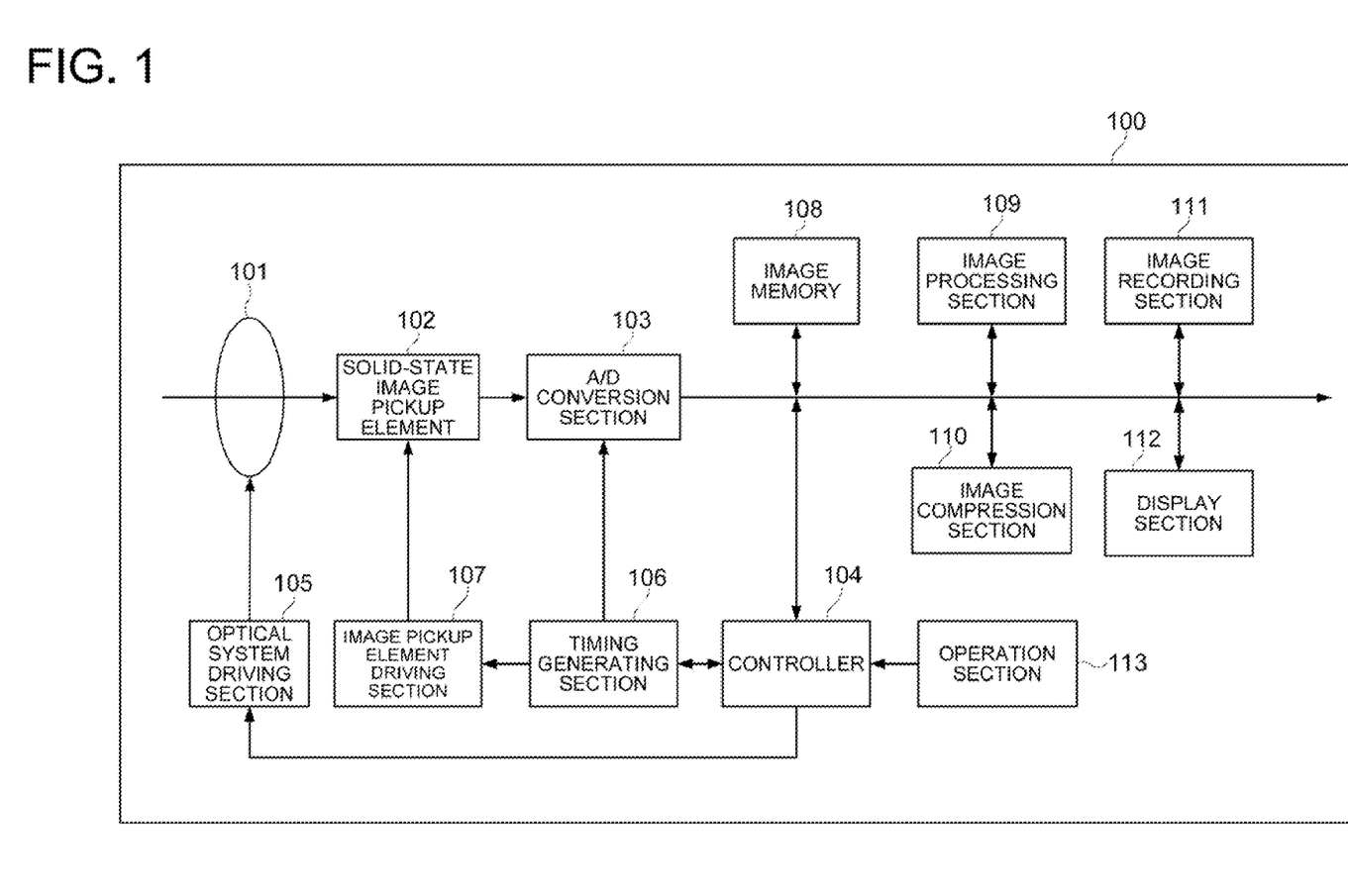
FIG. 1 is a block diagram showing an internal structure of digital still camera 100 of an embodiment of the present invention.

An apparatus structure of the present embodiment will be explained as follows, referring to FIG. 1 and FIG. 2. FIG. 1 shows an internal structure of digital still camera 100 of the present embodiment.

As shown in FIG. 1, digital still camera 100 serving as an image pickup apparatus is composed of optical system 101, solid-state image pickup element 102, A/D conversion section 103, controller 104, optical system driving section 105, timing generating section 106, image pickup element driving section 107, image memory 108, image processing section 109, image compression section 110, image recording section 111, display section 112 and of operation section 113.

Optical system 101 is an optical system including image pickup lens 1 described later, and light coming from a subject enters the optical system 101. Solid-state image pickup element 102 is an image pickup element such as CCD and CMOS (Complementary Metal-Oxide Semiconductor), and it photoelectrically converts incident light for each of R, G and B and outputs corresponding analog signal. A/D conversion section 103 converts analog signal into digital data.

Controller 104 controls various sections of digital still camera 100. The controller 104 includes CPU (Central Processing Unit), RAM (Random Access Memory) and ROM (Read Only Memory), and conducts various types of processing through cooperation of CPU and various types of programs developed on RAM after being read out from ROM.

Optical system driving section 105 drives and controls the optical system 101 in the case of varying power, focusing, and exposure, through control of controller 104. Timing generating section 106 outputs timing signals for outputting analog signals. Image pickup element driving section 107 controls and drives the scanning of the solid-state image pickup element 102.

Image memory 108 stores image data in a way that the image data is readable and writable. Image processing section 109 applies various types of image processing to image data. Image compression section 110 compresses picked-up image data through a compression method such as JPEG (Joint Photographic Experts Group). Image recording section 111 records image data on recording media such as SD (Secure Digital) memory card, a memory stick and an xD picture card.

Display section 112 is a color liquid crystal panel, and it displays taken images, through-lens images before taking image, and image for various types of operation. Operation section 113 includes a release button and various types of operation keys for setting various types of modes and various types of numerical values, and outputs information inputted by a user's operation to controller 104.

Operations on the digital camera 100 will be explained here. When taking an image of a subject, monitoring of the subject (displaying of through-lens images) and image taking are carried out. In the monitoring operation, an image of the subject obtained through optical system 101 is formed on a light-receiving surface of solid-state image pickup element 102. The solid-state image pickup element 102 arranged on the rear side of optical system 101 along an optical axis for taking image, is driven for scanning by timing generating section 106 and image pickup element driving section 107. The image pickup element 102 outputs analog signal corresponding to light images thereon as an output of photoelectric transduction equivalent to one frame per predetermined scanning cycle.

The analog signal is converted into digital data by A/D conversion section 103, after being gain-adjusted properly for each primary color component of RGB. Image processing section 109 applies color processing including pixel interpolation and γ correction to the digital data, and luminance signal Y and color difference signal Cb and Cr (image data) each in digital value are generated to be stored in image memory 108. The stored signal is read out periodically, thus, a video signal is generated to be outputted on display section 112.

In the monitoring operation, the display section 112 functions as an electronic finder, and displays images taken in the monitoring operation in real time. Under this situation, varying power, focusing and exposure of optical system 101 are established based on input of operation through operation section 113 by a user as needed.

Under this monitoring operation, when a user presses a shutter release button of the operation section 113 at the desirable timing for taking a still image, still image data are acquired. At the timing of pressing the shutter release button, image data for one frame stored in image memory 108 are read out to be compressed by image compression section 110.

The image data thus compressed are recorded on a recording medium by image recording section 111.

Figure 2:
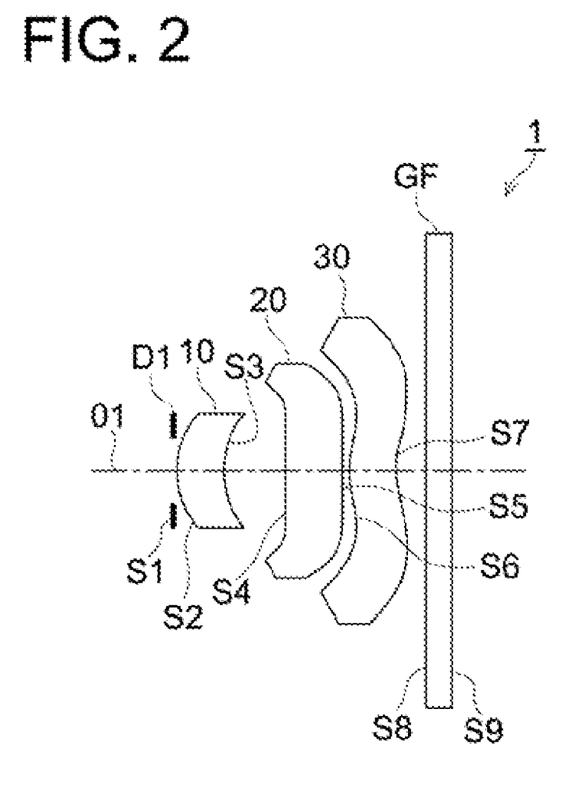
FIG. 2 is a diagram showing a structure of image pickup lens 1 included in optical system 101.

FIG. 2 shows a structure of image pickup lens 1 included in optical system 101. The image pickup lens 1 is composed of aperture stop D1, first lens 10 representing a positive meniscus lens (with positive power) whose surface facing the object side is a convex surface, second lens 20 representing a negative (with negative power) meniscus lens whose surface facing the image surface side is a concave surface, third lens 30 representing a negative meniscus lens whose surface facing the image surface side is a concave surface, and glass filter GF, in the order from the object side (photographic subject side) to the image surface side along optical axis O1, and unillustrated solid-state image pickup element 102 is arranged behind the glass filter GF. Meanwhile, it is also possible to employ the structure wherein a lowpass filter and an infrared blocking filter are provided in place of or in addition to the glass filter GF.

The aperture stop D1 has surface S1. The first lens 10 has surface S2 and surface S3 in the order from the object side to the image surface side along optical axis O1. The second lens 20 has surface 34 and surface S5 in the order from the object side to the image surface side along optical axis O1. The third lens 30 has surface S6 and surface 37 in the order from the object side to the image surface side along optical axis O1. The glass filter GF has surface S8 and surface S9 in the order from the object side to the image surface side along optical axis O1.

Next, ranges of conditional expressions to be satisfied by image pickup lens 1 in the present embodiment will be explained. Incidentally, it is not always necessary for the image pickup lens 1 in the present embodiment to satisfy all ranges of conditional expressions shown below simultaneously. By satisfying each range of conditional expression individually, it is possible to attain corresponding actions and effects. It is naturally more preferable, from the viewpoints of optical capability, downsizing and assembling, to satisfy plural ranges of conditional expressions.

First, the second lens 20 of the image pickup lens 1 satisfies the following conditional expression (1).

$$0.3 < (r21+r22)/(r21-r22) < 90 \quad (1)$$

In the expression, r21 is a curvature radius of a surface of the second lens facing the object side and r22 is a curvature radius of the surface of the second lens facing the image surface side.

When a value of the conditional expression (1) is lower than the lower limit thereof, comatic aberration is worsened and Petzval's sum is over-corrected, thereby, resolution runs short. When a value of the conditional expression (1) exceeds the upper limit of the conditional expression (1), Petzval's sum is under-corrected, and it becomes difficult to correct a curvature of field.

It is preferable that the second lens 20 satisfies the following conditional expression (1A), and it is more preferable that the second lens 20 satisfies the following conditional expression (1B).

$$1 < (r21+r22)/(r21-r22) < 3 \quad (1A)$$

$$1.3 < (r21+r22)/(r21-r22) < 2.5 \quad (1B)$$

The image pickup lens 1 satisfies the following conditional expression (2).

$$-0.6 < f/f2 < -0.05 \quad (2)$$

In the expression, f represents a focal length of the total system of image pickup lens 1, and f2 represents a focal length of the second lens 20.

When a value of the conditional expression (2) is lower than the lower limit thereof, comatic aberration is worsened and Petzval's sum is over-corrected, thereby, resolution runs short. When a value of the conditional expression (2) exceeds the upper limit of a range of the conditional expression (2), Petzval's sum is under-corrected, and it becomes difficult to correct a curvature of field.

It is preferable that image pickup lens 1 satisfies the following conditional expression (2A), and it is more preferable that the image pickup lens 1 satisfies the following conditional expression (213).

$$-0.4 < f/f2 < -0.1 \quad (2A)$$

$$-0.3 < f/f2 < -0.13 \quad (2B)$$

The image pickup lens 1 satisfies the following conditional expression (3).

$$0.05 < f/f3 < 0.6 \quad (3)$$

In the expression, f represents a focal length of the total system of image pickup lens 1, and f3 represents a focal length of the third lens 30.

When a value of the conditional expression (3) is lower than the lower limit thereof, comatic aberration is worsened and Petzval's sum is over-corrected, thereby, resolution runs short. When a value of the conditional expression (3) exceeds the upper limit of the conditional expression (3), Petzval's sum is under-corrected, and it becomes difficult to correct a curvature of field.

It is preferable that image pickup lens 1 satisfies the following conditional expression (3A), and it is more preferable that the image pickup lens 1 satisfies the following conditional expression (3B).

$$0.1 < f/f3 < 0.4 \quad (3A)$$

$$0.12 < f/f3 < 0.3 \quad (3B)$$

Image pickup lens 1 satisfies the following conditional expression (4).

$$0.05 < f/f1 < 1.6 \quad (4)$$

In the expression, f represents a focal length of the total system of image pickup lens 1, and f1 represents a focal length of the first lens 10.

When a value of the conditional expression (4) is lower than the lower limit thereof, comatic aberration is worsened and Petzval's sum is over-corrected, thereby, resolution runs short. When a value of the conditional expression (4) exceeds the upper limit of the conditional expression (4), Petzval's sum is under-corrected, and it becomes difficult to correct a curvature of field.

It is preferable that image pickup lens 1 satisfies the following conditional expression (4A), and it is more preferable that the image pickup lens 1 satisfies the following conditional expression (4B).

$$0.5 < f/f1 < 1.2 \quad (4A)$$

$$0.8 < f/f1 < 1.0 \quad (4B)$$

It is preferable that the second lens 20 of image pickup lens 1 includes a surface facing the image surface side which is an aspheric surface, and that the aspheric surface has a concave shape facing the image surface side at a paraxial portion around the optical axis O1 and has a convex shape facing the image surface side at the periphery. This has an effect to keep a position of an exit pupil at a distance on the convex surface on the periphery while downsizing the total length of the optical system on the concave surface in the paraxial portion around optical axis O1.

Further, it is preferable that the third lens 30 of image pickup lens 1 includes a surface facing the image surface side which is also an aspheric surface in the same way as in the second lens 20, and that the aspheric surface has a concave shape facing the image surface side at a paraxial portion around the optical axis O1 and has a convex shape facing the image surface side at the periphery. This has an effect to keep a position of an exit pupil at a distance on the convex surface on the periphery while downsizing the total length of the optical system on the concave surface in the paraxial portion around the optical axis O1.

Further, it is preferable that the image pickup lens 1 further includes aperture stop D1 on the object side of the first lens 10, as in the present embodiment. This has an effect to keep a position of an exit pupil at a distance, even when downsizing a total length of an optical system.

In the present embodiment, the second lens 20 satisfies conditional expression (1) (preferably, conditional expressions (1A) and (1B)). Owing to this, it is possible to prevent the image pickup lens from degradation of comatic aberration, and from insufficient resolution by making Petzval's sum to be appropriate, whereby, the field curvature can be corrected easily.

Further, in the present embodiment, the first lens 10 is provided as a meniscus lens whose surface facing the object side is convex. Due to this, a principal point can be positioned to be in front of the optical system, thus, an optical total length can be shortened, and spherical aberration and a field curvature can be easily corrected.

Further, the image pickup lens 1 satisfies conditional expression (2) (preferably, conditional expressions (2A) and (2B)). Owing to this, it is possible to prevent image pickup lens from degradation of comatic aberration, and from insufficient resolution by making Petzval's sum to be appropriate, whereby, the field curvature can be corrected easily.

Further, the image pickup lens 1 satisfies conditional expression (3) (preferably, conditional expressions (3A) and (3B)). Owing to this, it is possible to prevent the image pickup lens from degradation of comatic aberration, and from insufficient resolution by making Petzval's sum to be appropriate, whereby, the field curvature can be corrected easily.

Further, the image pickup lens 1 satisfies conditional expression (4) (preferably, conditional expressions (4A) and (4B)). Owing to this, it is possible to prevent image pickup lens from degradation of comatic aberration, and from insufficient resolution by making Petzval' sum to be appropriate, whereby, the field curvature can be corrected easily.

Further, in the present embodiment, the second lens 20 includes a surface facing the image surface side which is an aspheric surface, and the aspheric surface has a concave shape facing the image surface side at a paraxial portion around optical axis O1 and has a convex shape facing the image surface side the periphery. Owing to this, a position of an exit pupil can be kept at a distance in the same way on the convex surface on the periphery while downsizing the optical total length on the concave surface in the paraxial portion around the optical axis O1 of the second lens 20.

The third lens 30 includes a surface facing the image surface side which is an aspheric surface, and the aspheric surface has a concave shape facing the image surface side at a paraxial portion around the optical axis O1 and has a convex shape facing the image surface side at the periphery. Owing to this, a position of an exit pupil can be kept at a distance in the same way on the convex surface on the periphery portion while downsizing the optical total length on the concave surface in the paraxial portion around the optical axis O1 of the third lens 30.

Further, the image pickup lens 1 further includes aperture stop D1 arranged at a closer position to the object side than the first lens 10. Owing to this, it is possible to keep a position of an exit pupil at a distance, even when downsizing an optical total length.

Owing to the foregoing, image pickup lens 1 for solid-state image pickup element 102 can be made to be excellent in optical capability, to be low-cost and to be compact. It is further possible to contribute to provide digital still camera 100 with higher functions, lower cost and smaller size, by applying image pickup lens 1 to digital still camera 100.

EXAMPLE 1

Specific Example 1 relating to the aforesaid embodiment will be explained. Image pickup lens 1 of the present example satisfies the following Table 1.

TABLE 1

(a)

| i | ri | di | j | Nj | vj |
|---|---|---|---|---|---|
| 1 | ∞ | 0.050 | 1 | 1.53048 | 55.72 |
| 2 | 1.050 | 0.616 | | | |
| 3 | 1.687 | 0.789 | 2 | 1.53048 | 55.72 |
| 4 | 23.644 | 0.735 | | | |
| 5 | 5.285 | 0.100 | 3 | 1.58340 | 30.23 |
| 6 | 1.517 | 0.600 | | | |
| 7 | 1.594 | 0.390 | 4 | 1.51680 | 64.20 |
| 8 | ∞ | 0.300 | | | |
| 9 | ∞ | | | | |

(b)
Aspheric surface coefficient

Second surface S2

| $\epsilon =$ | −2.7098E+00 |
|---|---|
| A4 = | 4.3170E−01 |
| A6 = | −1.7513E−01 |

Third surface S3

| $\epsilon =$ | 1.8994E−01 |
|---|---|
| A4 = | 1.7788E−01 |
| A6 = | 3.3740E−01 |

Fourth surface S4

| $\epsilon =$ | 3.1000E+01 |
|---|---|
| A4 = | −2.4363E−02 |
| A6 = | 4.7477E−02 |
| A8 = | 1.2042E−02 |
| A10 = | −3.9879E−02 |

Fifth surface S5

| $\epsilon =$ | −1.0000E+00 |
|---|---|
| A4 = | −1.6251E−01 |
| A6 = | 1.9977E−03 |
| A8 = | 1.7857E−02 |
| A10 = | −1.2057E−02 |

Sixth surface S6

| $\epsilon =$ | 1.4616E−01 |
|---|---|
| A4 = | −3.4970E−01 |
| A6 = | 1.0130E−01 |
| A8 = | −6.4808E−02 |
| A10 = | 3.3679E−02 |
| A12 = | −5.6672E−03 |

Seventh surface S7

| $\epsilon =$ | −9.9056E−01 |
|---|---|
| A4 = | −2.1577E−01 |
| A6 = | 9.3098E−02 |

TABLE 1-continued

| | |
|---|---|
| A8 = | −3.5849E−02 |
| A10 = | 8.7226E−03 |
| A12 = | 8.8191E−04 |

(c)

| | |
|---|---|
| Conditional expression (1) | 1.58 |
| Conditional expression (2) | −0.27 |
| Conditional expression (3) | 0.25 |
| Conditional expression (4) | 0.90 |

In the aforesaid Table 1, (i=1, 2, 3 . . . ) represents a number of surface Si that is counted from the object side. The symbol ri represents a radius of curvature of the surface Si (i: a number) of an optical element. The symbol di represents axial distance of a surface (Si) [mm] (which represents thickness of an optical element or gap length of optical elements along optical axis O1). Further, j (j=1, 2, 3, 4) represents a number of $j^{th}$ lens that is counted from the object side, and glass filter GF corresponds to j=4. Nj represents a refractive index of $j^{th}$ optical element, and vj represents Abbe's number of $j^{th}$ optical element. Incidentally, a character E given to data in the examples indicates an exponent of the corresponding numerical value. For example, 1.0E-2 indicates $1.0 \times 10^{-2}$.

In the image pickup lens 1 of the present example, total focal length f is 3.52 [mm], f-number FNO is 4.0 and total axial surface space Ed is 3.580 [mm].

Further, as shown in the aforesaid Table 1, each of second surface S2, third surface S3, fourth surface S4, fifth surface S5, sixth surface S6 and seventh surface S7 shows that it is a refractive optical surface in an aspheric surface or a surface having refractive action equivalent to the aspheric surface. It is assumed that a shape of a surface of each aspheric surface is defined by the following expression (5).

[Numeral 1]

$$X(H) = \frac{C \cdot H^2}{1 + \sqrt{1 - \varepsilon \cdot C^2 \cdot H^2}} + \sum_k Ak \cdot H^k \quad (5)$$

In the expression, H represents a height in the direction perpendicular to an optical axis, X(H) represents a displacement amount (whose origin is an apex of the surface) in the optical axis direction at the position of height H, C represents a paraxial curvature, c represents a quadratic curved surface parameter and Ak represents $k^{th}$ order aspheric surface coefficient. Aspheric surface coefficients Ak which do not appear in Table 1 are 0.

The aforesaid Table 1 shows values of parameters prescribed by the aforesaid conditional expressions (1)-(4). As is shown in Table 1, values of parameters satisfy conditional expressions (1B), (2B), (3B) and (4B), respectively.

Each of FIGS. 3(a)-3(c) shows aberration of image pickup lens 1 in the present example. FIGS. 3(a)-3(c) show spherical aberration, astigmatism, distortion of image pickup lens 1 of Example 1.

In the spherical aberration diagram in FIG. 3(a), solid line d shows an amount of spherical aberration for d line, one-dot chain line g shows an amount of spherical aberration for g line, two-dot chain line c shows an amount of spherical aberration for c line and SC shows an amount of the offence against the sine condition, respectively. Further, in an astigmatism diagram in FIG. 3(b), solid line DS shows a sagittal surface and dotted line DM shows a meridional surface respectively. The y-axis in the spherical aberration diagram in FIG. 3(a) indicates an f-number of a ray of light. The y-axes in the astigmatism diagram in FIG. 3(b) and in the distortion diagram in FIG. 3(c) represent an image height, and the maximum image height is Y+=2.2.

As shown in FIGS. 3(a)-3(c), the image pickup lens 1 of the present example makes it possible to correct spherical aberration, astigmatism and distortion properly.

EXAMPLE 2

Specific Example 2 relating to the aforesaid embodiment will be explained. Image pickup lens 1 of the present example satisfies the following Table 2.

TABLE 2

(a)

| i | ri | di | j | Nj | vj |
|---|---|---|---|---|---|
| 1 | ∞ | 0.050 | 1 | 1.53048 | 55.72 |
| 2 | 1.078 | 0.615 | | | |
| 3 | 1.757 | 0.805 | 2 | 1.53048 | 55.72 |
| 4 | 25.743 | 0.760 | | | |
| 5 | 8.254 | 0.100 | 3 | 1.58340 | 30.23 |
| 6 | 1.559 | 0.600 | | | |
| 7 | 1.494 | 0.390 | 4 | 1.51680 | 64.20 |
| 8 | ∞ | 0.300 | | | |
| 9 | ∞ | | | | |

(b)
Aspheric surface coefficient

Second surface S2

| | |
|---|---|
| ε = | −2.9403E+00 |
| A4 = | 4.2136E−01 |
| A6 = | −1.8017E−01 |

Third surface S3

| | |
|---|---|
| ε = | −1.7164E−01 |
| A4 = | 1.7549E−01 |
| A6 = | 2.8790E−01 |

Fourth surface S4

| | |
|---|---|
| ε = | 1.0000E+00 |
| A4 = | −1.9256E−02 |
| A6 = | −3.3262E−02 |
| A8 = | 9.0867E−03 |
| A10 = | −3.9275E−02 |

Fifth surface S5

| | |
|---|---|
| ε = | −1.0000E+00 |
| A4 = | −1.4769E−01 |
| A6 = | 4.6008E−03 |
| A8 = | 1.5211E−02 |
| A10 = | −1.2083E−02 |

Sixth surface S6

| | |
|---|---|
| ε = | 2.7695E−01 |
| A4 = | −3.4505E−01 |
| A6 = | 9.5169E−02 |
| A8 = | −6.6262E−02 |
| A10 = | 3.3653E−02 |
| A12 = | −5.4785E−03 |

Seventh surface S7

| | |
|---|---|
| ε = | −6.2858E−01 |
| A4 = | −2.3023E−01 |
| A6 = | 9.5233E−02 |
| A8 = | −3.5676E−02 |
| A10 = | 8.6972E−03 |
| A12 = | −8.9418E−04 |

(c)

| | |
|---|---|
| Conditional expression (1) | 1.94 |
| Conditional expression (2) | −0.15 |

TABLE 2-continued

| Conditional expression (3) | 6.14 |
| Conditional expression (4) | 0.88 |

Respective symbols in the aforesaid Table 2 are the same as those in the aforesaid Table 1. In the image pickup lens 1 of the present example, total focal length f is 3.52 [mm], f-number FNO is 4.0 and total axial surface space Σd is 3.620 [mm].

Further, as shown in the aforesaid Table 2, each of second surface S2, third surface S3, fourth surface S4, fifth surface S5, sixth surface S6 and seventh surface S7 shows that it is a refractive optical surface in an aspheric surface shape or a surface having refractive action equivalent to the aspheric surface. A shape of a surface of each aspheric surface is defined by the aforesaid expression (5).

The aforesaid Table 2 shows values of parameters prescribed by the aforesaid conditional expressions (1)-(4). As is shown in Table 2, values of parameters satisfy conditional expressions (1B), (2B), (3B) and (4B), respectively.

Figure 4:
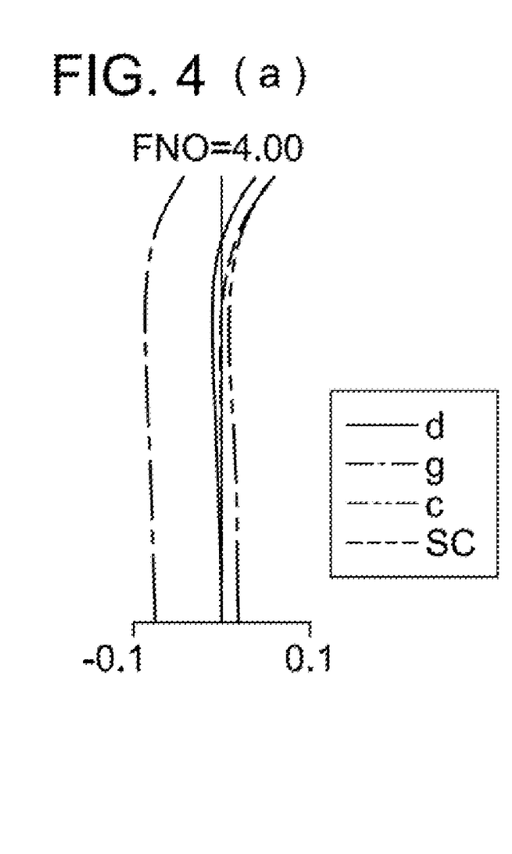
FIGS. 4(a)-4(c) are diagrams showing spherical aberration, astigmatism, and distortion of image pickup lens 1 in Example 2, respectively.

FIG. 4 shows aberration of image pickup lens 1 in the present example. FIGS. 4(*a*)-4(*c*) show spherical aberration, astigmatism, and distortion of image pickup lens 1 of the present example. Further, a y-axis in the spherical aberration diagram in FIG. 4(*a*) represents an f-number of a ray of light. A y-axis in each of an astigmatism diagram in FIG. 4(*b*) and a distortion diagram in FIG. 4(*c*) represents an image height, and the maximum image height is Y+=2.2.

Figure 3:
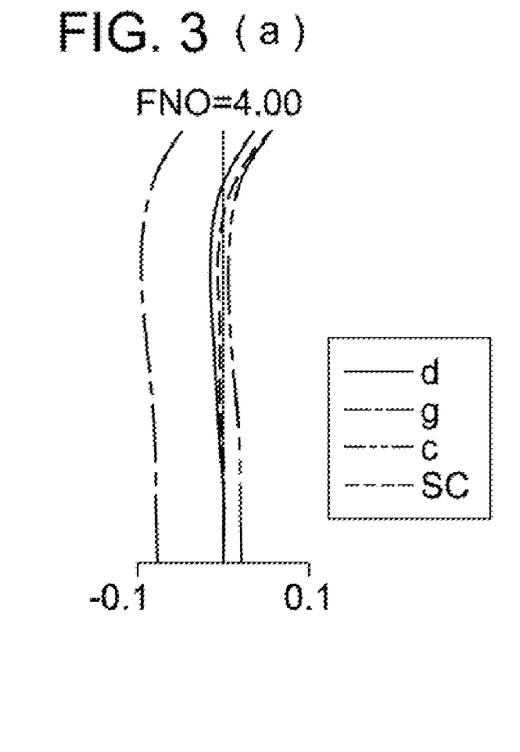
FIGS. 3(a)-3(c) are diagrams showing spherical aberration, astigmatism, and distortion of image pickup lens 1 in Example 1, respectively.

Respective symbols in FIG. 4(*a*)-4(*c*) are the same as those in FIG. 3(*a*)-3(*c*). As shown in FIGS. 4(*a*)-4(*c*), the image pickup lens 1 of the present example makes it possible to correct spherical aberration, astigmatism and distortion properly.

Incidentally, descriptions in the aforesaid embodiments and in respective examples are for an example of a suitable image pickup lens and an image pickup apparatus relating to the invention, and the invention is not limited to this.

For example, although an example of the digital still camera has been explained as an image pickup apparatus carrying an image pickup lens in the aforesaid embodiment and in the respective examples, the invention is not limited to the image pickup apparatus. Mobile terminals having at least image pickup functions such as a video camera, a cell-phone equipped with image pickup functions, PHS (Personal Handyphone System) and PDA (Personal Digital Assistant) may also be employed.

In addition, an image pickup apparatus carrying an image pickup lens may also be employed as an image pickup unit that is housed in the aforesaid equipment. Now, an example of cell-phone 200 carrying image pickup unit 250 that serves as an image pickup apparatus will be explained as follows, referring to FIG. 5 which shows an internal structure of the cell-phone 200.

Figure 5:
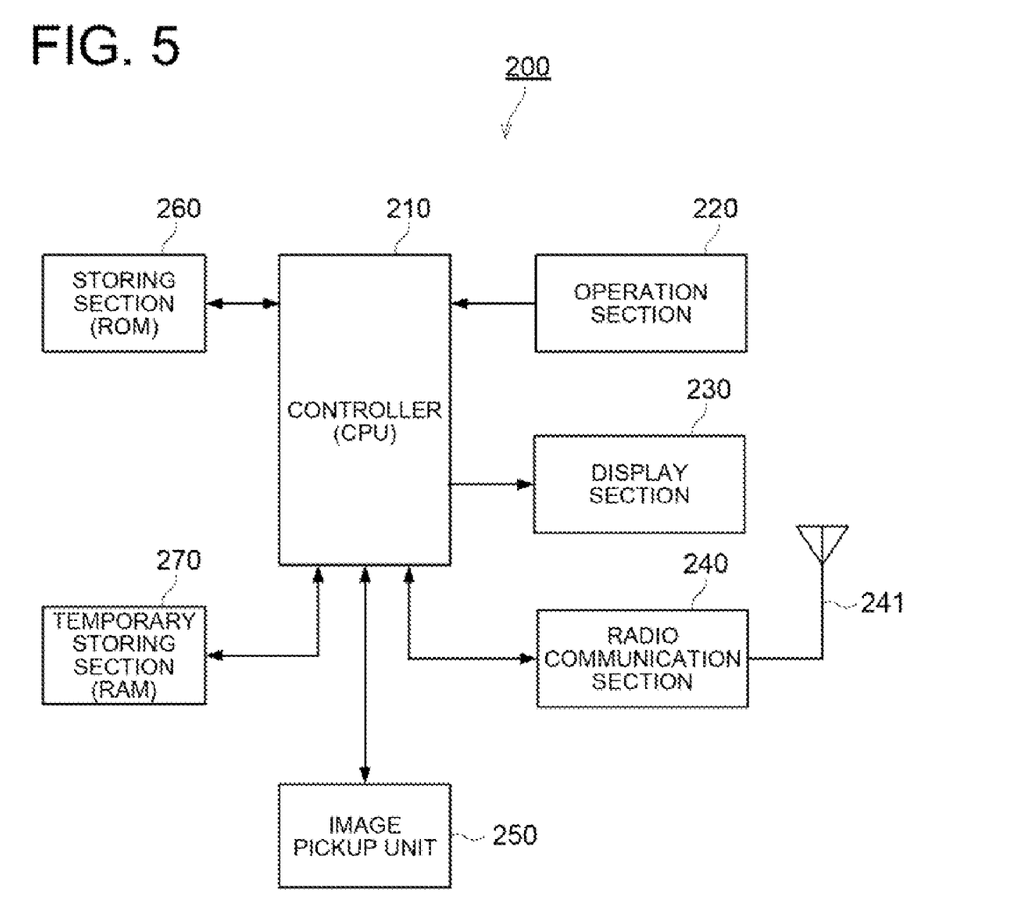
FIG. 5 is a block diagram showing an internal structure of cell-phone 200.

As shown in FIG. 5, the cell-phone 200 is composed of controller (CPU) 210 that controls respective portions generally, operation section 220 for inputting numbers for operation by a key, display section 230 that displays images picked up in addition to described data, radio communication section 240 for realizing various types of information communication with outer servers through antennas, image pickup unit 250 serving as an image pickup apparatus, storing section (ROM) 260 that stores system program of cell-phone 200, various processing programs and various data such as terminal ID and of temporary storing section (RAM) 270 that is used as a working area where various processing programs to be carried out by controller 210 and data, processed data, or image pickup data acquired by image pickup unit 250, are stored temporarily.

The image pickup unit 250 is composed of image pickup lens 1, a (solid-state) image pickup element, a lens tube and a drive mechanism for the image pickup lens 1. The image pickup unit 250 itself has neither a controller nor image processing section, and is made to be a lens unit that is presupposed to be connected to the controller, an operation section and to a display section by a connector. Specifically, the image pickup unit 250 is arranged at a position such that, for example, an end surface of a main frame on the subject side of an image pickup system is arranged on the back of cell-phone 200 (where main display section of display section 230 is assumed to be the front), and is arranged at the lower position of a main display section. Further, an outer connection terminal of the image pickup unit 250 is connected to controller 210 of cell-phone 200, to output image signal such as luminance signal and color difference signal to controller 210 side. Image signal inputted from the image pickup unit 250 is stored in storing section 280 by a controlling system of cell-phone 200, or it is displayed on display section 230, or further, is transmitted out as image information through radio communication section 240.

Alternatively, the image pickup unit serving as an image pickup apparatus carrying an image pickup lens may include the above lens unit, and the controller and an image processing section arranged on the substrate, and may also be constituted to be a camera module that is provided on the assumption that the camera module is used with being connected by a connector to a separate object having a display section and an operation section.

The invention claimed is:

1. An image pickup system comprising, in order from an object side thereof:
   an image pickup lens consisting of:
      a first lens;
      a second lens comprising a surface facing an image surface side of the image pickup lens which is an aspheric surface having a concave shape facing the image surface side at a paraxial portion and having a convex shape facing the image surface side at a periphery; and
      a third lens,
   wherein the second lens satisfies the following expression:

$$0.3 < (r21 + r22)/(r21 - r22) < 90 \quad (1)$$

where r21 is a curvature radius of a surface of the second lens facing the object side and r22 is a curvature radius of the surface of the second lens facing the image surface side.

2. The image pickup system of claim 1, wherein the first lens is a meniscus lens whose surface facing the object side is a convex surface.

3. The image pickup system of claim 1, wherein the third lens comprises a surface facing the image surface side which is an aspheric surface having a concave shape facing the image surface side at a paraxial portion and having a convex shape facing the image surface side at a periphery.

4. The image pickup system of claim 1, further comprising:
   an aperture stop arranged at a closer position to the object side than the first lens.

5. An image pickup system, comprising:
   an image pickup lens consisting of, in order from an object side thereof:
      a first lens;

a second lens comprising a surface facing an image surface side of the image pickup lens which is an aspheric surface having a concave shape facing the image surface side at a paraxial portion and having a convex shape facing the image surface side at a periphery, the second lens satisfying the following expression:

$$0.3 < (r21+r22)/(r21-r22) < 90$$

where r21 is a curvature radius of a surface of the second lens facing an object side and r22 is a curvature radius of the surface of the second lens facing an image surface side; and a third lens; and a solid-state image pickup element for conducting an image-pickup using a light flux entering therein through the image pickup lens.

6. The image pickup system of claim 1, wherein the second lens satisfies the expression $1 < (r21+r22)/(r21-r22) < 3$.

7. The image pickup system of claim 1, wherein the second lens satisfies the expression $1.3 < (r21+r22)/(r21-r22) < 2.5$.

8. The image pickup system of claim 7, wherein the image pickup lens satisfies the expression $-0.6 < f/f2 < -0.05$, where f represents a focal length of the image pickup lens and f2 represents a focal length of the second lens.

9. The image pickup system of claim 8, wherein the image pickup lens satisfies the expression $-0.4 < f/f2 < -0.1$.

10. The image pickup system of claim 8, wherein the image pickup lens satisfies the expression $-0.3 < f/f2 < -0.13$.

11. The image pickup system of claim 1, wherein the image pickup lens satisfies the expression $0.05 < f/f3 < 0.6$, where f represents a focal length of the image pickup lens and f3 represents a focal length of the third lens.

12. The image pickup system of claim 11, wherein the image pickup lens satisfies the expression $0.1 < f/f3 < 0.4$.

13. The image pickup system of claim 11, wherein the image pickup lens satisfies the expression $0.12 < f/f3 < 0.3$.

14. The image pickup system of claim 1, wherein the image pickup lens satisfies the expression $0.05 < f/f1 < 1.6$, where f represents a focal length of the image pickup lens and f1 represents a focal length of the first lens.

15. The image pickup system of claim 14, wherein the image pickup lens satisfies the expression $0.5 < f/f1 < 1.2$.

16. The image pickup system of claim 14, wherein the image pickup lens satisfies the expression $0.8 < f/f1 < 1.0$.

17. The image pickup system of claim 1, wherein:

the second lens satisfies the expression $1.3 < (r21+r22)/(r21-r22) < 2.5$;

the image pickup lens satisfies the expression $0.8 < f/f1 < 1.0$, where f represents a focal length of the image pickup lens and f1 represents a focal length of the first lens;

the image pickup lens satisfies the expression $-0.3 < f/f2 < -0.13$, where f2 represents a focal length of the second lens; and the image pickup lens satisfies the expression $0.12 < f/f3 < 0.3$, where f3 represents a focal length of the third lens.

* * * * *